United States Patent
Chu et al.

(10) Patent No.: US 9,712,406 B2
(45) Date of Patent: Jul. 18, 2017

(54) METHOD AND APPARATUS FOR ANALYZING AND VERIFYING FUNCTIONALITY OF MULTIPLE NETWORK DEVICES

(71) Applicants: Tai-Chuan Chu, Fremont, CA (US); Tianxiang You, Sunnyvale, CA (US); Bob Liu, Milpitas, CA (US); Tammy Thuyanh Doan, Santa Clara, CA (US)

(72) Inventors: Tai-Chuan Chu, Fremont, CA (US); Tianxiang You, Sunnyvale, CA (US); Bob Liu, Milpitas, CA (US); Tammy Thuyanh Doan, Santa Clara, CA (US)

(73) Assignee: Netgear, Inc., Carlsbad, CA (US)

( * ) Notice: Subject to any disclaimer, the term of this patent is extended or adjusted under 35 U.S.C. 154(b) by 342 days.

(21) Appl. No.: 14/207,013

(22) Filed: Mar. 12, 2014

(65) Prior Publication Data

US 2014/0269386 A1 Sep. 18, 2014

Related U.S. Application Data

(60) Provisional application No. 61/790,659, filed on Mar. 15, 2013.

(51) Int. Cl.
*H04L 12/24* (2006.01)
*H04L 12/26* (2006.01)
*H04L 29/06* (2006.01)
*H04L 29/12* (2006.01)

(52) U.S. Cl.
CPC ........ *H04L 43/065* (2013.01); *H04L 41/0866* (2013.01); *H04L 41/145* (2013.01); *H04L 41/22* (2013.01); *H04L 41/28* (2013.01); *H04L 43/50* (2013.01); *H04L 63/08* (2013.01); *H04L 41/12* (2013.01); *H04L 61/103* (2013.01); *H04L 61/2007* (2013.01)

(58) Field of Classification Search
CPC ................................ H04L 41/22; H04L 63/12
See application file for complete search history.

(56) References Cited

U.S. PATENT DOCUMENTS

| | | | |
|---|---|---|---|
| 7,126,453 B2 * | 10/2006 | Sandau | G07C 9/00309 307/10.1 |
| 2005/0193294 A1 * | 9/2005 | Hildebrant | G01R 31/2886 714/723 |
| 2007/0266289 A1 * | 11/2007 | Yang | G06F 11/2294 714/742 |

(Continued)

*Primary Examiner* — Shaq Taha
(74) *Attorney, Agent, or Firm* — James M. Wu; JW Law Group

(57) ABSTRACT

A network device test station ("TS") is capable of simultaneously testing and verifying a group of routers and/or switches at the same time. The TS includes a user interface ("UI"), a test bed engine, and a TS manager. The UI facilitates interactive communication between TS and user via an interactive graphical representations showing, for example, test configurations and test results. The test bed engine uses a set of test beds to conduct tests on attached devices or routers which are also known as device under tests ("DUTs") or unit under tests ("UUTs"). The TS manager is configured to provide a test environment with one or more emulated communication networks for verifying functionalities of every DUT.

17 Claims, 10 Drawing Sheets

(56) References Cited

U.S. PATENT DOCUMENTS

2008/0126868 A1* 5/2008 Murray ............... G06F 11/3648
                                                        714/37
2008/0140831 A1* 6/2008 Kawana ................. H04L 41/00
                                                        709/224

* cited by examiner

METHOD AND APPARATUS FOR ANALYZING AND VERIFYING FUNCTIONALITY OF MULTIPLE NETWORK DEVICES

PRIORITY

This application claims the benefit of priority based upon U.S. Provisional Patent Application Ser. No. 61/790,659, filed on Mar. 15, 2013 in the name of the same inventors and having a title of "Method and Apparatus for Analyzing and Verifying Functionality of Multiple Network Devices Concurrently," hereby incorporated into the present application by reference.

FIELD

The exemplary embodiment(s) of the present invention relates to the field of communications network. More specifically, the exemplary embodiment(s) of the present invention relates to testing network devices.

BACKGROUND

With increasing demand for Internet availabilities and more data, communication networks and/or infrastructures are continuously improved and/or updated. A high-speed communication network typically includes hundreds network devices, such as access switches, routers, and bridges, to facilitate fast delivery of information packets and/or data traffic from source devices to destination devices. A challenge to maintain and/or repair such high-speed communication network is that upon detecting an error or fault, the network providers, operators, and/or administrators need to test and/or debug voluminous network devices quickly to reduce the network down time.

A problem associated with supporting and/or maintaining a communications network is that upon discovering a failure or error associated with a portion of the network containing multiple network devices such as routers and switches, it is often difficult to verify whether such network devices contain software errors, hardware errors, and/or no errors. For example, some routers or switches have slow response times under a newly upgraded network because some of routers may need new software patches while others may have hardware defects. A convention approach to identify detected error is to test or manually test each device individually to determine the source of error(s).

SUMMARY

One embodiment of the present invention discloses a network device test station ("NDTS" or "TS") capable of testing multiple network devices at the same time. The NDTS is capable of simultaneously testing and verifying a group of routers and/or switches at the same time. The NDTS or TS includes a user interface ("UI"), a test bed engine, and a TS manager. The UI facilitates interactive communication between TS and user via an interactive graphical representations showing, for example, test configurations and test results. The test bed engine uses a set of test beds to run tests on the attached devices or routers which are also known as device under tests ("DUTs") or unit under tests ("UUTs"). The TS manager is configured to provide a test environment with one or more emulated communication networks for verifying functionalities of every DUT.

Additional features and benefits of the exemplary embodiment(s) of the present invention will become apparent from the detailed description, figures and claims set forth below.

BRIEF DESCRIPTION OF THE DRAWINGS

The exemplary embodiment(s) of the present invention will be understood more fully from the detailed description given below and from the accompanying drawings of various embodiments of the invention, which, however, should not be taken to limit the invention to the specific embodiments, but are for explanation and understanding only.

DETAILED DESCRIPTION

Figure 1:
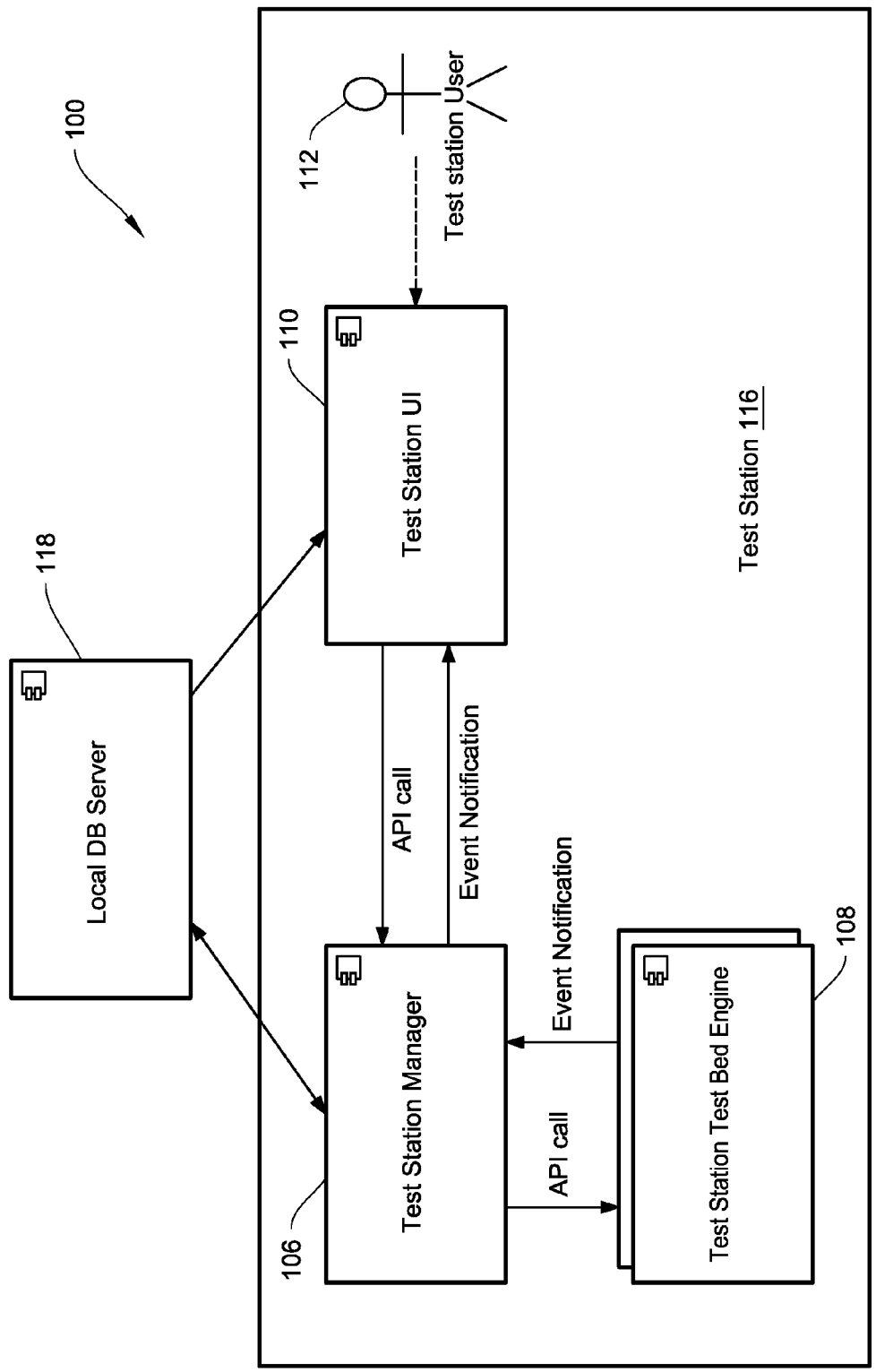
FIG. 1 is a block diagram illustrating a network device test station or test station ("TS") able to provide tests to verify functionalities of various connected network devices simultaneously in accordance with one embodiment of the present invention.

Exemplary embodiment(s) of the present invention is described herein in the context of a method, system, configuration, and apparatus of providing a network device test station ("NDTS") or test station ("TS") able to test multiple network devices such as routers simultaneously.

Those of ordinary skills in the art will realize that the following detailed description of the exemplary embodiment(s) is illustrative only and is not intended to be in any way limiting. Other embodiments will readily suggest themselves to such skilled persons having the benefit of this disclosure. Reference will now be made in detail to implementations of the exemplary embodiment(s) as illustrated in the accompanying drawings. The same reference indicators will be used throughout the drawings and the following detailed description to refer to the same or like parts.

In the interest of clarity, not all of the routine features of the implementations described herein are shown and described. It will, of course, be understood that in the development of any such actual implementation, numerous implementation-specific decisions may be made in order to achieve the developer's specific goals, such as compliance with application- and business-related constraints, and that these specific goals will vary from one implementation to another and from one developer to another. Moreover, it will be understood that such a development effort might be complex and time-consuming, but would nevertheless be a routine undertaking of engineering for those of ordinary skills in the art having the benefit of embodiment(s) of this disclosure.

Various embodiments of the present invention illustrated in the drawings may not be drawn to scale. Rather, the dimensions of the various features may be expanded or reduced for clarity. In addition, some of the drawings may be simplified for clarity. Thus, the drawings may not depict all of the components of a given apparatus (e.g., device) or method.

Unless otherwise defined, all terms (including technical and scientific terms) used herein have the same meaning as commonly understood by one of ordinary skills in the art to which the exemplary embodiment(s) belongs. It will be further understood that terms, such as those defined in commonly used dictionaries, should be interpreted as having a meaning that is consistent with their meaning in the context of the relevant art and this exemplary embodiment(s) of the disclosure.

As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. The term "and/or" includes any and all combinations of one or more of the associated listed items.

The term "system" is used generically herein to describe any number of components, elements, sub-systems, devices, packet switch elements, packet switches, access switches, routers, networks, computer and/or communication devices or mechanisms, or combinations of components thereof. The term "computer" includes a processor, memory, and buses capable of executing instruction wherein the computer refers to one or a cluster of computers, personal computers, workstations, mainframes, or combinations of computers thereof.

IP communication network, IP network, or communication network means any type of network having an access network able to transmit data in the form of packets or cells, such as ATM (Asynchronous Transfer Mode) type, on a transport medium, for example, the TCP/IP or UDP/IP type. ATM cells are the result of decomposition (or segmentation) of packets of data, IP type, and those packets (here IP packets) comprise an IP header, a header specific to the transport medium (for example UDP or TCP) and payload data. The IP network may also include a satellite network, a DVB-RCS (Digital Video Broadcasting-Return Channel System) network, providing Internet access via satellite, or an SDMB (Satellite Digital Multimedia Broadcast) network, a terrestrial network, a cable (xDSL) network or a mobile or cellular network (GPRS/EDGE, or UMTS (where applicable of the MBMS (Multimedia Broadcast/Multicast Services) type, or the evolution of the UMTS known as LTE (Long Term Evolution), or DVB-H (Digital Video Broadcasting-Handhelds)), or a hybrid (satellite and terrestrial) network.

In accordance with the present invention, the components, process steps, and/or data structures described herein may be implemented using various types of operating systems, computing platforms, computer programs, and/or general purpose machines. In addition, those of ordinary skills in the art will recognize that devices of a less general purpose nature, such as hardwired devices, field programmable gate arrays (FPGAs), application specific integrated circuits (ASICs), or the like, may also be used without departing from the scope and spirit of the inventive concepts disclosed herein. Where a method comprising a series of process steps is implemented by a computer or a machine and those process steps can be stored as a series of instructions readable by the machine, they may be stored on a tangible medium such as a computer memory device (e.g., ROM (Read Only Memory), PROM (Programmable Read Only Memory), EEPROM (Electrically Erasable Programmable Read Only Memory), FLASH Memory, Jump Drive, and the like), magnetic storage medium (e.g., tape, magnetic disk drive, and the like), optical storage medium (e.g., CD-ROM, DVD-ROM, paper card and paper tape, and the like) and other known types of program memory.

One embodiment of the present invention discloses an NDTS or TS capable of providing simultaneous same or different tests to a group of network devices such as routers at the same time. The NDTS or TS includes a user interface ("UI"), a test bed engine, and a TS manager. The UI, in one embodiment, facilitates interactive communication between the TS and a user via interactive graphical representations such as requesting inputs and/or reporting status. The test bed engine uses a set of test beds to conduct tests on the DUTs. The TS manager is, in one aspect, provides or emulates a test environment or environments suitable to test functionalities of every DUT.

FIG. 1 is a block diagram 100 illustrating NDTS or TS able to provide tests to verify functionalities of various connected network devices simultaneously in accordance with one embodiment of the present invention. Diagram 100 includes a TS 116, a local database ("DB") server 118, and a user 112. TS 116, in one embodiment, includes a test station ("TS") manager 106, a user UI 110, and test bed engine 108. It should be noted that the underlying concept of the exemplary embodiment(s) of the present invention would not change if one or more components (or elements) were added to or removed from diagram 100.

UI 110, in one aspect, is configured to facilitate interactive communications between TS 116 and user 112. Various graphical display or graphical representation showing up-to-date testing configurations, test procedures, testing progress, and/or test results can be simultaneously illustrated in pictorial animations. UI 110, in one example, includes an authenticator (or login module) and a configuration illustrator wherein the configuration illustrator is able to show current testing setups, configuration, and/or topology. The authenticator, in one embodiment, authenticates user's or operator's identity via an interactive graphically illustrated login process. The configuration illustrator illustrates a testing configuration or setup topology via a graphical animation. Alternatively, UI 110 further includes a testing monitor which monitors or tracks testing status and/or testing progress. Note that the testing progress status can be updated at the same time or substantially the same time for all DUTs. It should be noted that UI 110 can also be referred to as graphical user interface ("GUI"), TS UI, TS GUI, user UI, and the like.

Test bed engine 108, in one embodiment, includes a set of test beds, a DUT detector, a network environment duplicator, and an IP address generator. The test beds contains one or more connectors, such as RJ (registered jack) connectors, USB (universal serial bus) connectors, thunderbolts, and/or serial connectors, configured to communicate with the attached DUTs. The DUT detector, in one example, is able to sense via a sensor the number of DUTs currently attached to test bed engine 108. The network environment duplicator, in one embodiment, provides or emulates one or more independent communication networks suitable for detected DUTs for testing. In one embodiment, the IP address generator is configured to generate unique IP addresses for attached DUTs to reduce to address contention during testing. It should be noted that test bed engine 108 can also be referred to as test bed controller, test bed distributor, DUT manager, and so forth.

TS manager 106, in one embodiment, includes a client server interface, a database interface, a user verification module, and a monitoring component, wherein TS manager 106 is capable of emulating one or more test environments suitable for the attached DUTs for network related verification test. In one aspect, TS manager 106 retrieves the product specifications associated with product serial number from a local database such as DB server 118 in accordance with the information provided by the detected DUT. DUT, for example, can be a router, a switch, a bridge, a hub, or a network device that is able to transmit data packets via a network. TS manager 106 manages and activates concurrent verification tests on DUTs in response to the product specifications. It should be noted that TS manager 106 can also be referred to as TS controller, TS processor, platform manager, platform processor, TS platform manager, and the like.

TS 116 is also coupled to a DB via local DB server 118 for providing or storing information relating to various product identifications ("IDs") and product specifications associated with the DUTs. The DB can also be internal to TS 116 instead of being located in server 118. Alternatively, DB can also be located in a remote server connected via one or more networks such as Internet. TS 116 may be deployed at the customer site, provider site, content site, and the like. TS 116, which can also be referred to as TS system, TS platform, $2^{nd}$ generation intelligent test station ("ITS2"), and TS device, includes components such as GUI, test station manager, test bed test engine and MySQL local database server.

An advantage of using TS is that it is able to test multiple DUTs concurrently. It should be noted that TS manager 106, test bed engine 108, and/or UI 110 includes, but not limited to, processor(s), memory devices, communication components such as transceiver, and/or buses.

Figure 2:
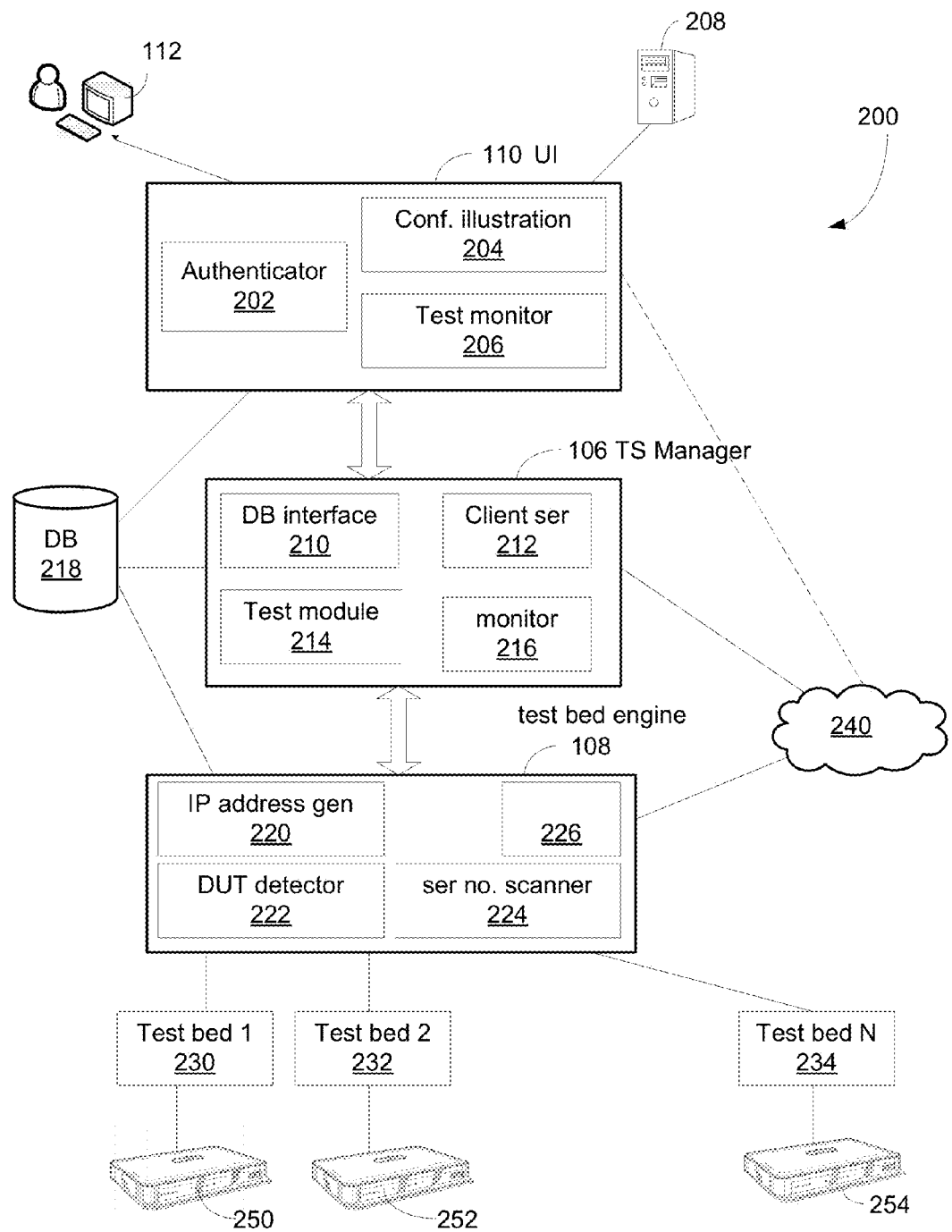
FIG. 2 is a block diagram illustrating an exemplary embodiment of TS capable of currently testing multiple routers simultaneously in accordance with one embodiment of the present invention.

FIG. 2 is a block diagram 200 illustrating an exemplary embodiment of TS capable of currently testing multiple routers simultaneously in accordance with one embodiment of the present invention. Diagram 200, which is similar to diagram 100 illustrated in FIG. 1, includes, TS manager 106, UI 110, user 112, DB 218, and test bed engine 108. Test bed engine 108 further includes a set of test beds 230-234 that are able to couple to one or more network devices or DUTs 250-254. It should be noted that the underlying concept of the exemplary embodiment(s) of the present invention would not change if one or more components (or elements) were added to or removed from diagram 200.

The test station or TS, including hardware, firmware, and software, is organized with TS UI 110, TS manager 106, and TS test bed engine 108. UI 110 provides an interactive interface between operator 112 and the TS. User 112, for example, is able to manage or control product selection, Ethernet clamp maintenance, test execution, and status monitoring through individual test bed. User 112 can be a provider, operator, end user, server, and the like. It should be noted that the TS can also be controlled or managed by a local or remote server or user such as server 208.

UI 110, in one embodiment, includes an authenticator, a configuration illustration module 204, and a test monitor 206 wherein the authenticator is responsible for authenticating a user or a machine requesting TS access. UI 110 or test station UI is a user interface that enables an operator to interact with the TS and execute tests on the supported products and/or routers. For instance, to access the TS, user 112 or server 208 is required to log in the TS to substantiate authenticity of user 112. User's account information or subscription can be stored in UI 110, DB 218, and/or TS manager 106. UI 110, in one example, is also capable of communicating with user via Internet 240 for authentication and/or subscription.

Configuration illustration module 204, in one example, is used to display graphical representation or animations capable of showing testing configuration and/or test status. The graphical representation and/or animations can be projected or displayed at the user's screen. The graphical representation, in one example, is configured to concurrently display multiple testing status and testing configuration of DUTs at the same time or on a single display or screen. Module 204 allows an operator to monitor multiple testing reports relating to multiple DUTs at the same time. Test monitor 206, in one example, is used to interactively communicate with TS manager 106 and user 112.

DB 218, which may reside in a local or remote server, stores various testing related information, such as TS subscription/account information, product identification, specifications, warranty, and/or product verifications. It should be noted that testing a DUT requires product related information, such as specification, warranty, and/or product verification. The test results and test procedures are stored in DB 218. It should be noted that DB 218 can be accessed or shared by various components, such as UI 110, TS manager 106, and test bed engine 108.

TS manager 106, in one embodiment, includes a DB interface 210, client server interface 212, test module 214, and monitor 216. DB interface 210 is responsible for communicating and managing data stored in DB 218. If requested data is not in DB 218, DB interface 210, in one aspect, is capable of facilitating an online search to find the requested data via Internet 240. For example, when product specification associated to an attached router cannot be found in DB 218, DB interface 210 may optionally launch an online search based on the DUT ID. After locating relevant online websites such as manufacture website, the missing data such as product specification may be automatically downloaded from the website via Internet 240.

DB interface 210 includes various modules such as DbComm.DbCommIntf.py module that provide operations for read and write, and create entries from/to one or more my standard query language ("MySQL") DB tables. Note that MySQL is an open source relational database management system. In one example, DbComm.DbServices.py module builds on top of DbCommIntf.py and provides higher level network services. The DB tables include ethernet_clamps table and test_data table. In an operation, subroutine startTest( ) in DbCommIntf class module generates an entry in test_data table before the test starts. Note that a sequence number for the entry may be used, returned, and/or recorded for status updating. Upon completing the test, the test result is written to DB (i.e., saveTestResult( )) whereby the previously generated entry is updated using the stored sequence number(s). In one example, various testing related information, such as user id, serial number, test status, failure reason, test station id, test bed ID, Ethernet clamp ID, Mac address, and product type, is maintained and updated in a predefined frame.

Client server interface ("CSI") 212 is used to provide communication between UI 110 and TS manager 106. During an operation, client server interface 212, including various modules such as GuiComm.GuiCommIntf.py, provides messaging services between TS manager 106 and test bed engine(s) 108 along with test inputs and test procedures in response at least partially to input from user 112 or 208 via GUI. CSI 212, in one aspect, monitors signal(s) or messages from socket of test beds 230-234 for testing. Upon detecting a connection between a router and a test bed, a transmission control protocol ("TCP") connection between the client and server is created. Note that message dispatching is handled by a dedicated thread. In one aspect, incoming messages are placed into multiple (i.e., five) different queues depending on intended receivers. For example, one queue is dedicated to TS manager 106 and other queues for the test beds. TS manager 106 and test bed engine 108 check their queues for messages using, for example, GUI.

Each message, for example, is formatted with multiple fields, such as message ID, message type, and message body. Certain message may be shared by multiple components such as TS manager 106 and test bed engine 108. For instance, a message such as GuiCommIntf may be shared by TS manager 106 and test bed engine 108. Note that a message is dispatched based on its ID(s). The encoding of message body depends upon the message type. The messaging mechanism built on top of TCP socket provides reliable inter-process communication ("IPC") for client server communication.

TS manager 106 further includes a login module such as LoggingIntf.py wherein the module provides login services for tests. For example, the login module uses instruction such as configTestbedLogging( ) to setup an execution log file. The test result or result report is filed and/or broadcasted based on per execution basis. In an operation, login files are placed in temporary directories. When testing four routers or DUTs, the login directories are divided into four temporary subdirectories such as /tmp/DUT/[1-4]. The four subdirectories 1, 2, 3 and 4 are dedicated for test execution at test bed 1 to 4. To handle internal messages, test bed engine 108, for example, activates a procedure such as method log( ) to log or store different level of messages in a file, wherein the file subsequently can be used for status report. If a message is of level STATUS or REPORT, the message is also sent to GUI client as well as inside log( ).

Test module 214 is used to provide test sequence based on detected DUT's specification. Monitor 216 is employed to provide communication between test bed engine 108 and test monitor 206 whereby real-time active communication between the TS and user 112 is established. It should be noted that DB interface 210, CSI 212, test module 214, and monitor 216 can be combined into one or two components. TS manager 106, which manages local resources for the TS, can facilitate testing a range between one (1) to sixteen (16) DUTs or unit under tests ("UUTs") 250-254 concurrently. To simplify the forgoing discussion, a range of one (1) to four (4) DUTs or UUTs is used therein.

Test bed engine 108 includes a set of test beds 230-234, IP address generator 220, DUT detector 222, and serial number scanner ("SNS") 224. Test bed engine 108 may also include other components 226 such as web interface. For example, component 226 may allow test bed engine 108 to communicate with Internet 240. In one aspect, test bed engine 108 can manage up to four (4) test beds. Alternatively, test bed engine 108 may be able to handle a set of test beds ranging from 1 to 64.

Each UUT or DUT together with associated or allocated resources (i.e., traffic generator, test fixture, test bed, or APIs) form a testing configuration. Multiple active test beds mean multiple UUTs are currently under test simultaneously. In one aspect, the test executed by a test bed is managed by bed test engine 108. Multiple instances of test beds indicate concurrently tests running across multiple UUTs.

SNS 224 includes one or more scanners located around test beds 230-234 for obtaining serial number(s) associated with attached DUTs. Upon detecting or sensing an attached DUT, DUT detector 222 activates SNS 224 to identify the identity of the attached DUT. Upon obtaining the serial number associated with the attached DUT, DB 218 is searched in accordance with the serial number to determine whether any related information such as product ID and product specification can be found in DB 218. Once the related product identity and specification are determined, a set of associated predefined tests is loaded which will determine whether the connected DUT has a hard error or soft error or no error.

Hard error, for example, is a hardware failure and the DUT may not be able to recover unless there is an existence of a software patch. Soft error, for instance, can be a software related fault that may be fixable if a fix or patch can be reloaded or reinstalled. An advantage of using the TS is that multiple routers or switches can be upgraded simultaneously.

To help monitor the health status of the test station system, a module, such as Monitor.py, provides monitoring services on a liveliness of MySQL DB server and provides connectivity status. When MySQL DB is not accessible, GUI is notified and the ITS2 application may be suspended or terminated. Without the DB access, ITS2 application cannot continue to run. It also monitors virtual private network ("VPN") connecting to the server(s) and will try to reconnect if Internet access is available.

The TS includes VPN module, such as VpnClient.py module, which is configured to automatically connect the TS to a VPN server. For each test station and MySQL DB server, a VPN account is created. Note that the TS or DB server uses web interface to log in the account and sets up the VPN connection. For example, VPN module makes use of selenium web driver of python binding to automate the login process.

The TS includes test module, such as TM.py module, which provides main thread that acts as the server for GUI client communication. TS manager thread also starts another thread for GUI messaging when the client is connected. GUI messaging, in one example, relieves the traffic loading from other thread(s) from waiting for messages from GUI. The test module instantiates four (4) test bed engine threads based on the user selected product and instantiates a monitor thread to monitor the MySQL server status. In one aspect, the main thread runs in a loop servicing messages from GUI client. The TS messages from GUI are handled by the main thread which includes handling changing user, changing product, entering serial number verification, entering quit application, et cetera.

An advantage of using the TS is that the TS is efficient requiring minimal resources to concurrently test as well as upgrade software, firmware, and hardware for multiple DUTs simultaneously. Another advantage is that the TS can be easily manageable and expandable based on the demand and configuration. The boundary between TS framework and product specific tests can be flexibly improved and defined. The TS framework also provides a defined infrastructure interface for testing DUTs.

Figure 3:
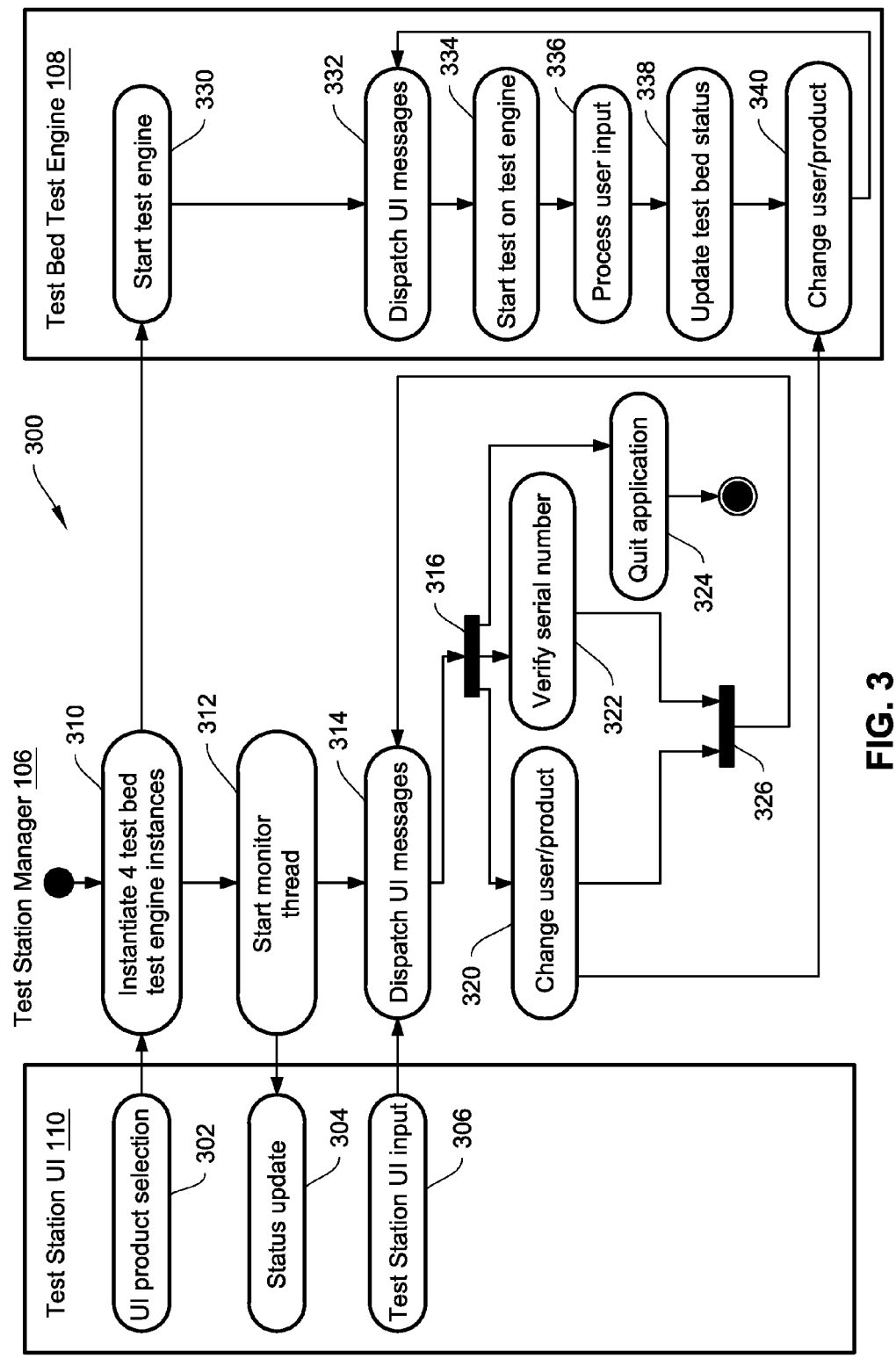
FIG. 3 illustrates a logic flow showing instructions between UI, TS manager, and test bed engine in accordance with one embodiment of the present invention.

FIG. 3 illustrates a logic flow 300 showing instructions between UI, TS manager, and test bed engine in accordance with one embodiment of the present invention. At block 302, a UI product selection at UI 100 is selected and subsequently is sent to TS manager 106. Four (4) test bed instances are instantiated at block 310 and subsequently instructs test bed engine 108 to start test engine at block 330. After starting monitor thread at block 312, status update is activated at block 304. At block 314, a UI message is dispatched in response to input from block 306 and block 312. UI message is selected at selector 316. The test application is quit at block 328 if UI message is a quit application at block 324. If UI message is to verify serial number at block 322, the process loops back to block 314 via selector 326. If UI message is to change user or product at block 320, the process proceeds to block 314 as well as block 340 at test bed engine 108. After dispatching UI message at block 332, test bed engine is started at block 334. After processing user input at block 336, the test bed status is updated at block 338. After handling change product at block 340, the process proceeds to block 332.

TS manager 106, in one embodiment, includes local DB interface, GUI interface, logging services, DB monitoring, and VPN module for managing resources and services. The local DB interface provides interfaces between test bed engine 108 and the DB server regarding test result from and/or to the server. Historical data as well as new data can be accessed by one or more DUTs.

In one embodiment, TS manager 106 manages activation of test beds as well as termination of test beds via test bed engine 108. Each UUT and its allocated resources (layer 2 switch ports, wireless bridge client, Fluke DMM, test fixture, etc.) form a test bed configuration. The test execution carried out at a test bed is managed by test bed engine 108. Test sequences are defined in the test suite file. The test module is defined or selected based on product and dependent on test bed hardware resources. The test suite file defines the interface between a common test engine and product specific tests.

Figure 4:
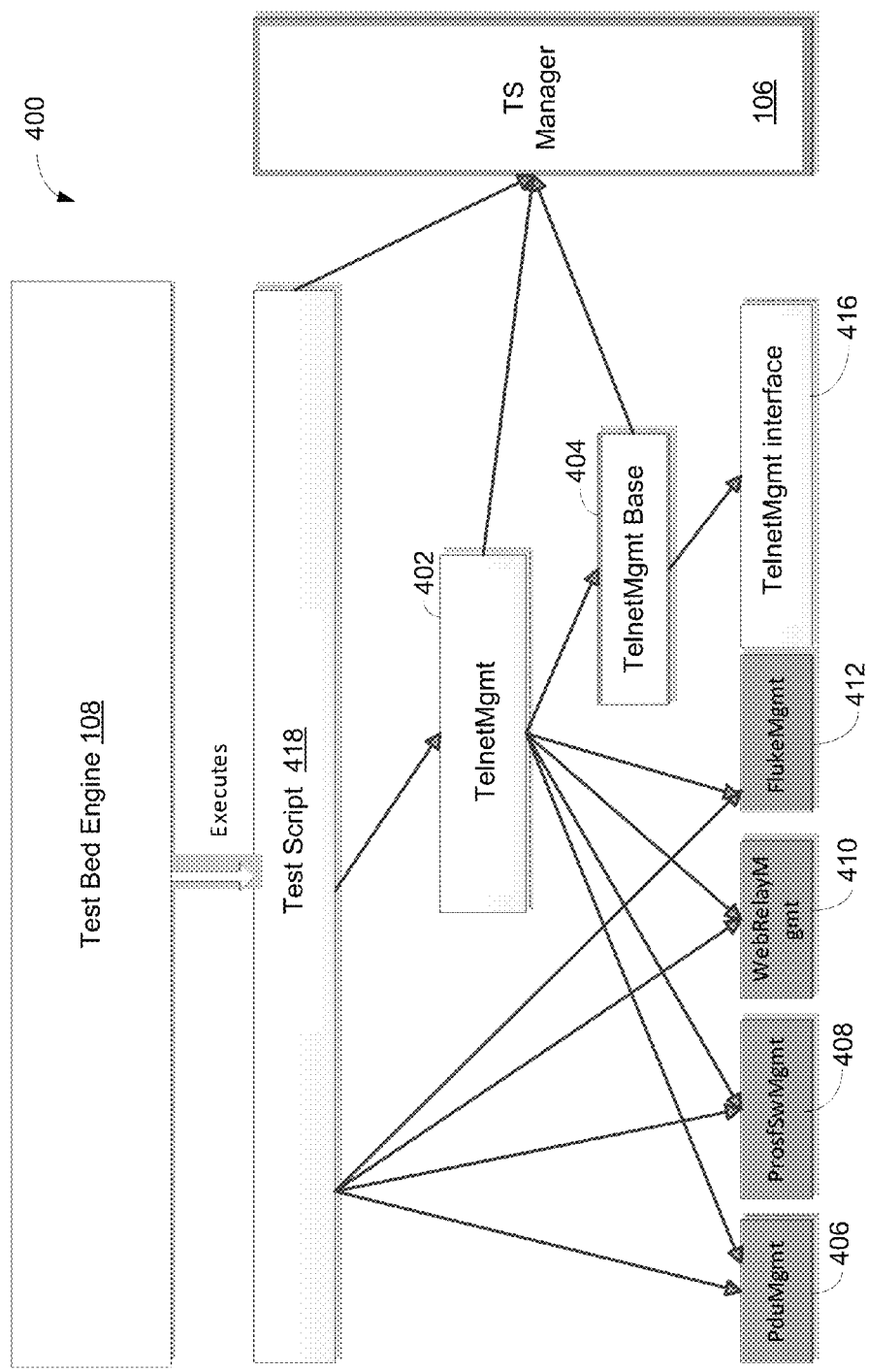
FIG. 4 is a block diagram illustrating an exemplary embodiment of test bed engine coupled to TS manager and able to test multiple attached network devices simultaneously in accordance with one embodiment of the present invention.

FIG. 4 is a block diagram 400 illustrating an embodiment of test bed engine able to test multiple network devices simultaneously in accordance with one embodiment of the present invention. Diagram 400 includes test bed engine 108, a test script module 418, and TS manager 106. Test script module 418, in one aspect, is a firmware and/or software module configured to communicate with various components and/or test modules, such as, but not limited to, TelnetMgmt 402, TelnetMgmt base 404, PduMgmt 406, ProsfSwMgmt 408, WebRelayMgmt 410, FlukeMgmt 412, and TelnetMgmt interface 416. Additional test modules such as SkuMgmt and TE may also be participated during a testing process. It should be noted that the underlying concept of the exemplary embodiment(s) of the present invention would not change if one or more components (or modules) were added to or removed from diagram 400.

The test modules such as TelnetMgmt 402 or ProsfSwMgmt 408 are located in a directory in test bed engine 108. For example, the directory, also known as TS LIB/TestEngine, is further divided into a set of subdirectories to store other modules. Some modules such as SkuMgmt and TelnetMgmt 402 are generally related to the UUT or DUT. The other modules such as ProsfSwMgmt 408, WebRelayMgmt 410, FlukeMgmt 412, and PduMgmt 406 are used for test bed resource management. The test bed resource management references the UUT management to develop or compose test sequences and/or test procedures for DUT tests.

During an operation, upon activating the TS, test bed engine 108 initiates DUT detector to detect and/or count the number of DUTs that are attached to the test beds. After scanning DUTs' product labels via scanners located at the test beds, DUTs' product serial numbers or product information are obtained from DB. If any scanner fails to read DUT's product information, test bed engine 108 sends a request to the operator inquiry a manual input for the product information. Once the product information, such as product serial number or product manufacture, is entered, TS manager 106 searches a local DB to retrieve DUT product identity and specification based on the product information. In the event that DUT product identity and/or specification cannot be found in the local DB, the TS, in one embodiment, activates a predefined web-search process trying to identify and retrieve product information over the Internet. After obtaining the product information, a predefined set of test procedure(s) or test cases based on the DUT specification is executed to determine whether the DUTs have hard errors, soft errors, and/or no errors.

Test script module 418 coupled to TS manager 106 is coupled to telnetMamt module 402, PduMgmt module 406, ProsfSwMgmt module 408, WeRelay Mgmt module 410, and FlukeMgmt module 412. The modules are stored in a directory which is further divided into subdirectories also known as Test Engine subdirectories. To separate test development modules from modules for test infrastructure/common services, modules for handling test bed resources are decoupled from shared, reusable (TS), and common service modules. For example, test bed engine 108 is capable of parsing a suite file associated with the selected product and test. Note that different technology used in the DUT requires different types of test cases or test procedures.

TelnetMgmt module 402, which resides in a TestEngine/TelnetMgmt subdirectory, is able to configure and/or retrieve states of various UUTs or DUTs. Various telnet commands or routines, such as configLedTest( ), config24GSsid( ), config5GSsid( ), and configResetTest( ), are used to perform different types of tests to the UUT(s) or DUT(s).

SkuMgmt module 412, which may reside in a subdirectory such as TestEngine/SkuMgmt subdirectory, is capable of implementing test cases directed to the UUT access. In one aspect, SkuMgmt 412 is able to communicate with a DUT or UUT via TelnetMgmt module 402. The test sequences used in SkuMgmt 412, in one example, includes ledTest( ), wanTest( ), resetTest( ), wpsTest( ), wifiResetTest( ), usbTest( ), wireless24GTest( ), wireless5GTest( ), and the like.

Test bed engine 108 further includes one or more test script modules used for executing tests specified in the suite file. The tests, in one example, are able to interact with one or more test bed resources as well as the attached UUT or DUT. For example, performing a current draw test on a particular DUT may involve FlukeMgmt 412, PduMgmt 406, and WebRelayMgmt 410.

FlukeMgmt module 412, also known as FlukeMgmtIntf.py, defines features, interfaces, and configurations associated with Fluke digital multi-meter capable of measuring current or DC current as well as reading current. For example, FlukeMgmt 412 such as FlukeServices.py adds web relay control to read DC current. In one embodiment, test bed engine 108 includes three (3) relays used on a single test bed so that one Fluke digital meter can be shared among the other test beds. After the read operation, FlukMgmt 412 switches on the relay with direct power connection and switches off the two relays connected to the meter. The Fluke meter is available for other test beds.

WebRelayMgmt module 410, also known as WebRelayMgmtIntf.py, is configured to switch on or off a relay which controls status and activities UUT. WebRelayMagmt module 410 is coupled to a Fluke digital meter used to measure or read current flows. ProsfSwMgmt module 408, also known as a fully managed layer 2 switch, is used to manage test beds and controls turning on/off Ethernet ports connected to various UUTs. During a port access such as an LAN port, ProsfSwMgmt module 408 turns on (or off) the ports based on the test procedure during the test. PduMgmt module 406, also known as DcPduMgmtIntf.py module, is used to implement or provide adaptor pattern(s) in response to direction provided by other modules such as WebRelayMgmt module 410.

An advantage of using the TS having test bed engine 108 is that the TS has a well-defined interface boundary which allows the TS to expend in support of different or new products.

Figure 5:
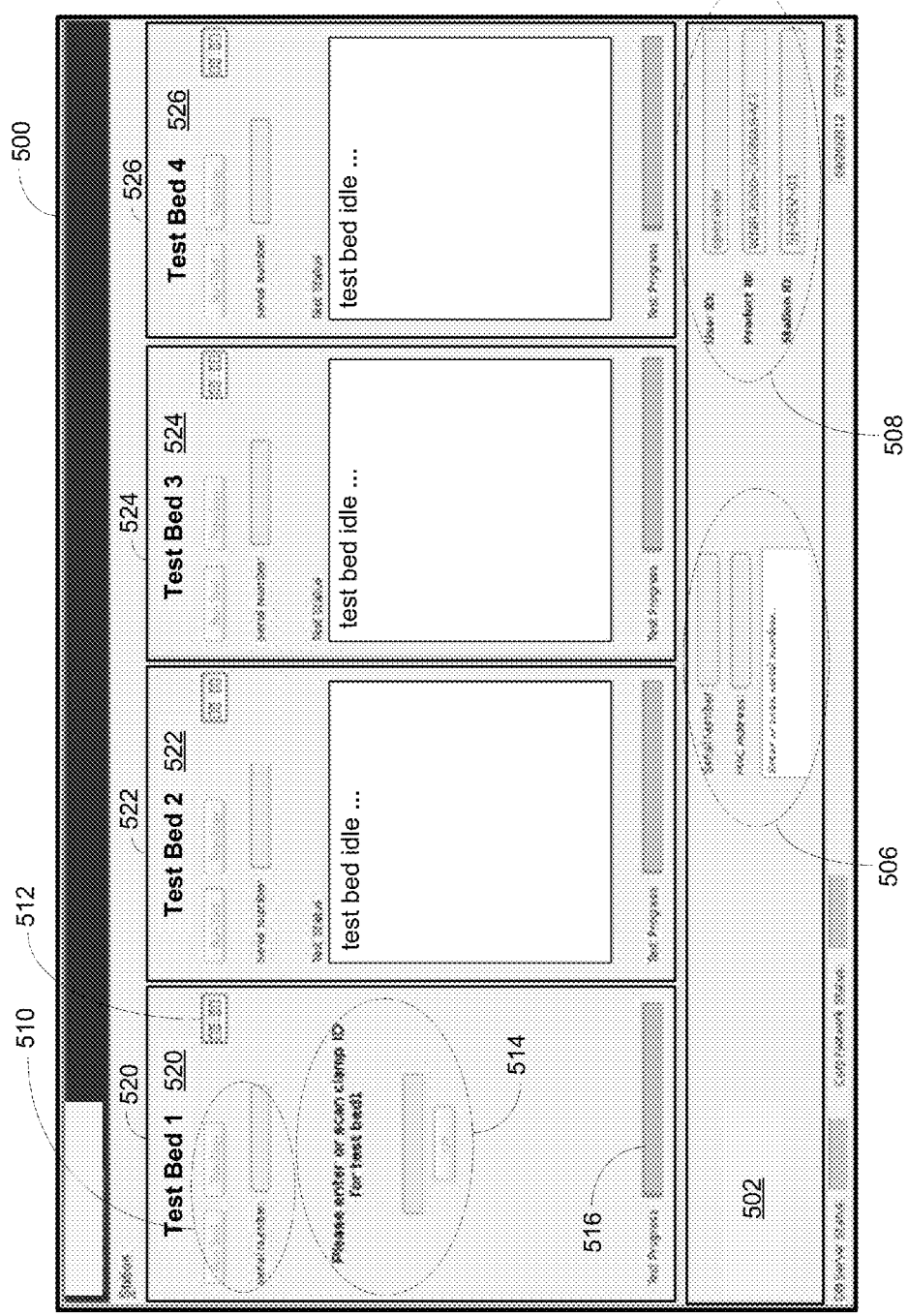
FIG. 5 illustrates a graphical representation showing status associated with various test beds in accordance with one embodiment of the present invention.

FIG. 5 illustrates a graphical representation ("GR") 500 showing status associated with various test beds in accordance with one embodiment of the present invention. GR 500 includes four GUI tiles 520-526 and a bottom status bar 502 wherein tiles 520-526 illustrate four (4) test beds 1 to 4. Each tile such as test bed 1 includes a status window 514, a command button section 510, a clock 512, and a test progress bar 516. While test bed 1 detects a DUT, test beds 2-4 are idling indicating there are no DUTs attached. It should be noted that the underlying concept of the exemplary embodiment(s) of the present invention would not change if one or more tiles (or windows) were added to or removed from GR 500.

Bottom status bar 502, in one embodiment, includes two boxes 506-508 wherein box 508 includes a user ID indicator, a product ID indicator, and a station ID indicator. Box 506, in one example, includes a serial number entry, a MAC address entry, and a central information box. Test progress bar 516 illustrates a graphical representation indicating, for example, a percentage of total tests that has been completed. Test window 510 includes a run test button, a topology and status button, and a serial number box that is able to activate the test procedure(s) when the run test button is clicked.

Figure 6:
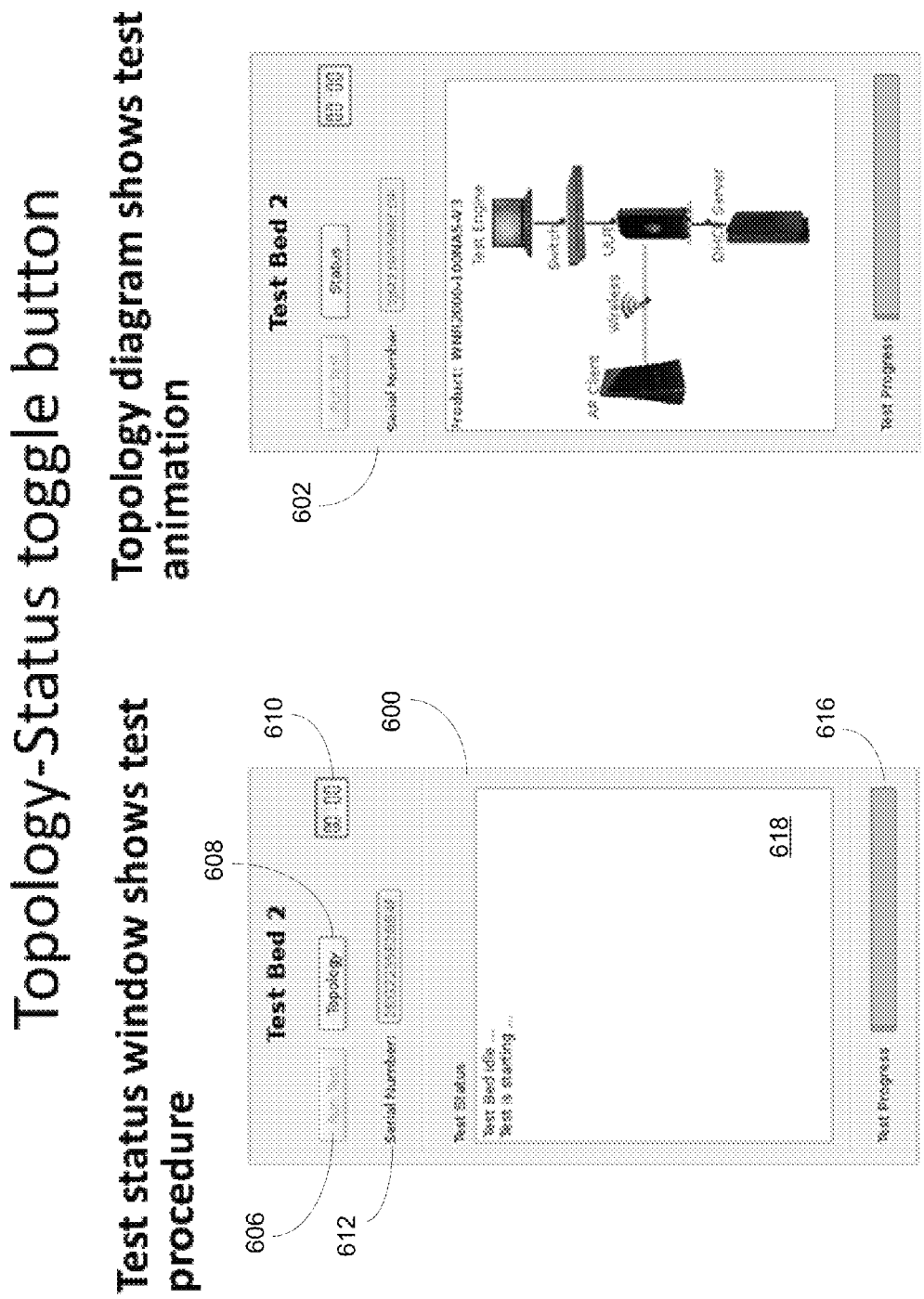
FIG. 6 illustrates graphical representations showing a real-time test status tile and a topology diagram tile in accordance with one embodiment of the present invention.

FIG. 6 illustrates graphical representations showing a real-time test status tile 600 and a topology diagram tile 602 in accordance with one embodiment of the present invention. Status tile 600 illustrates test bed 2 in a graphic representation in which test bed 2, for example, includes a run test button 606, a topology and status button 608, a digital clock 610, a serial number box 612, a test progress bar 612, and a status window 618. Run test button 606 is configured to allow a user to push or click to start the test. Serial number box 612 displays a serial number of a UUT. In one aspect, box 612 is also allowed a user to change and/or enter a new clamp ID and/or serial number for the test. Digital clock 610 counts testing time and record the test time when the test is finished. Topology button 608 is configured to toggle between the topology tile 602 and test status tile 600 when the button is clicked. Test progress bar 616 displays the percentage of the test finished.

Figure 7:
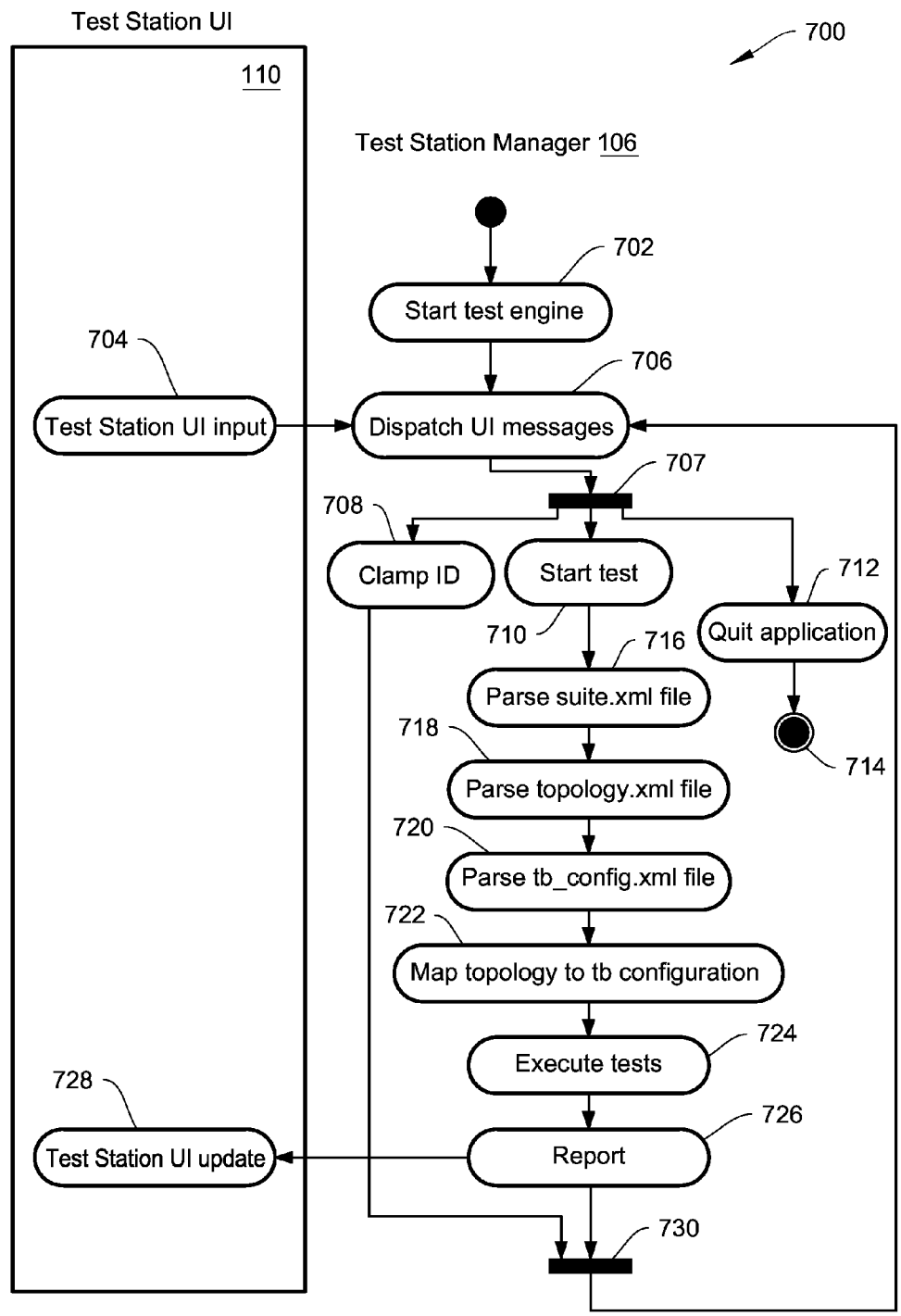
FIG. 7 is a block diagram illustrating a logic flow of TS manager in accordance with one embodiment of the present invention.

FIG. 7 illustrates a logic flow 700 showing logic process between TS manager and UI in accordance with one embodiment of the present invention. Flow 700 illustrates UI 110 and TS manager 106 wherein TS manager 106 actives test bed engine at block 702. After receiving input or message from UI 110 at block 704, the UI message(s) or input is dispatched to block 706. Test procedure is started at block 710 in accordance with the dispatched message(s) via block 707. After parsing suite file at block 716, parsing topology file at block 718, and parsing test bed configuration file at block 720, a test bed configuration is mapped or generated at block 722. At block 724, the test procedures are executed. After execution, a report, at block 726, is generated and subsequently is sent to UI 110 for updating at block 728. The process proceeds to block 730. Alternatively, if the dispatched message contains a clamp ID at block 708, the process proceeds to block 730. At block 730, the process loops back to block 706. If, at block 707, the dispatched message contains a quit application or command, the process ends at block 714.

To manage internal messages, TS manager 106 employs a main thread while test bed engine 108 employs multiple threads wherein each test bed is assigned with one thread. Each test bed engine thread manages the test execution on a test bed. The test engine thread runs in a loop servicing messages from GUI client. For example, upon receipt of a quit commend or message, the test engine thread terminates or ends the testing procedure. Similarly, upon receipt of a start message or command, the thread initiates and executes a predefined test procedure(s). Once a thread is activated, the test suite file is parsed by the engine. After retrieving the test module and test sequence information, a test bed topology file and test bed configuration file are parsed. Upon verifying topology file(s) specifying the test bed, attached DUT, and associated resources, an actual or unique IP address is assigned or mapped to the test bed. Note that IP address can include physical port, media access control ("MAC") address, physical address associated with a specific test bed. When the test object is instantiated, the thread contains data relating to the test bed configuration. The tests specified in the test suite file are executed or run sequentially based on the sequence number of each test. The final test report is subsequently sent to GUI client.

Figure 8:
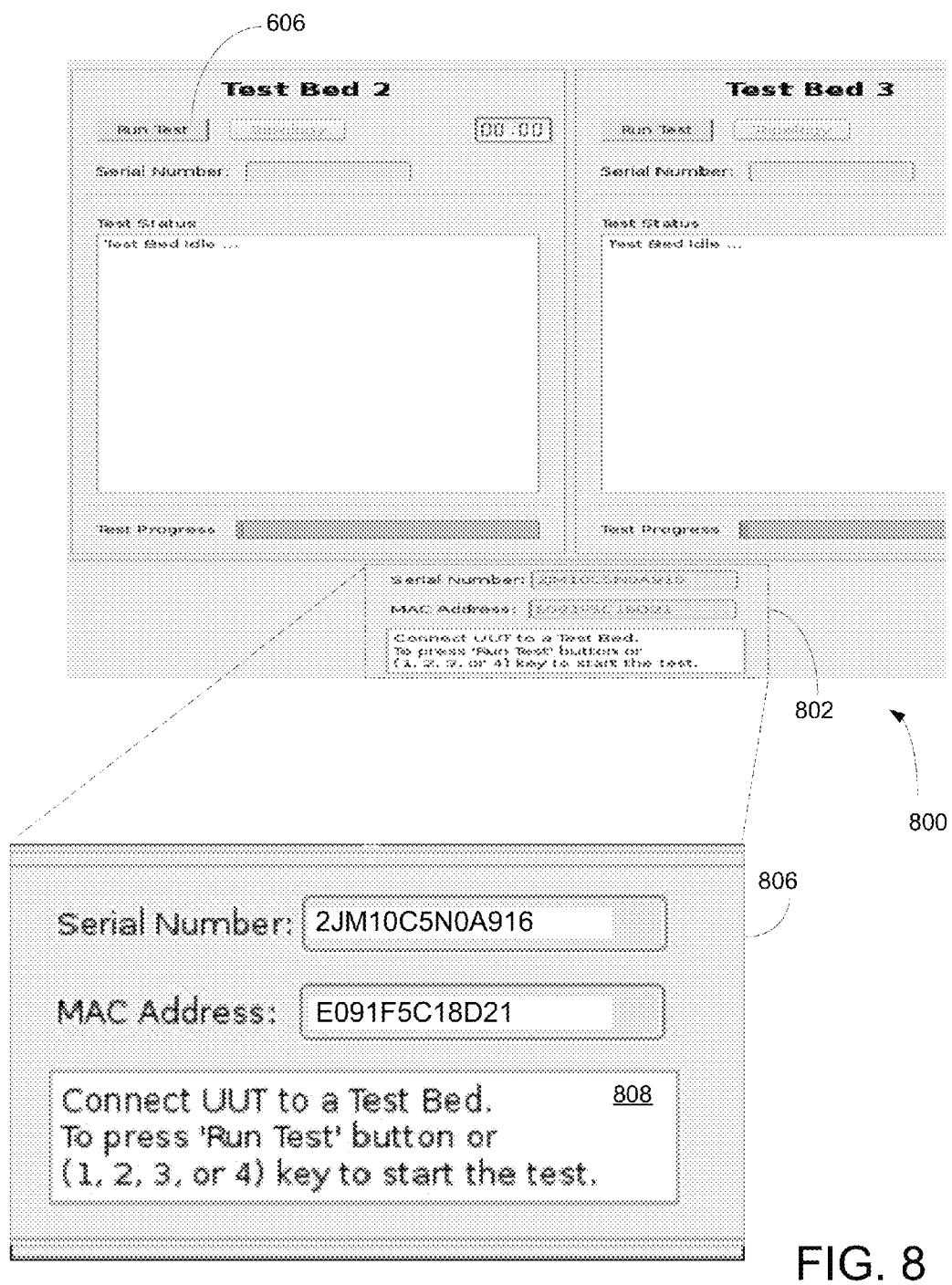
FIG. 8 illustrates graphical representations showing test bed displays in accordance with one embodiment of the present invention.

FIG. 8 is a block diagram 800 illustrating a graphical representation of user interface in accordance with one embodiment of the present invention. Diagram 800, which is similar to diagram 500 shown in FIG. 5, includes test bed 2 with a box 802 wherein box 806 is an enlarged picture of box 802. Box 806 includes a serial number entry, MAC address entry, and central info box 808 wherein the central info box 808 provides or displays information relating to the verification entries. In one aspect, central info box 808 provides information to the user as well as the user can make input based on the information displayed. Serial Number entry provides an entry box allowing an operator or user to enter a DUT or UUT serial number. MAC address entry provides an interactive box allowing an operator or user to enter a DUT or UUT MAC address.

In one embodiment, the TS GUI function includes one or more message handlers capable of transmitting and receiving messages to and from one or more servers during the test. Messages from the server, for example, will be appended in a queue according to a First-come-First-Served scheme. In one aspect, one interactive message will be displayed on the GUI at any giving time. If a widget is flashed in a window or box, an interactive response may be needed. For example, a response to the TS can be performed by pressing a "1", "2", "3", and "4" key or space bar.

Figure 9:
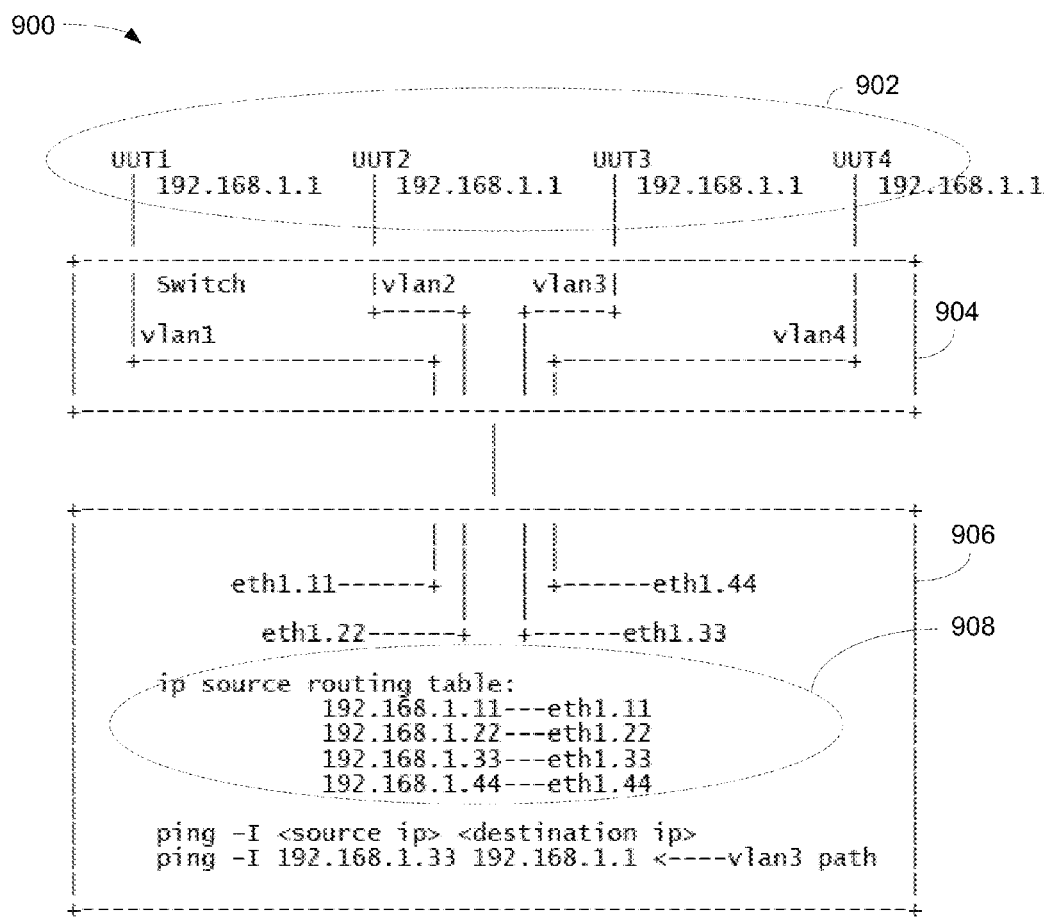
FIG. 9 is a block diagram illustrating a mechanism of generating unique IP addresses for DUTs in accordance with one embodiment of the present invention.

FIG. 9 is a block diagram 900 illustrating a mechanism of generating unique IP addresses for DUTs in accordance with one embodiment of the present invention. Diagram 900 includes four (4) UUTs 902, a switch 904, and test bed engine 906 wherein test bed engine further includes an IP source routing table 908. In one aspect, test bed engine 906 uses table 908 to generate unique IP address to every attached UUT. For example, UUTs are assigned to a similar IP address as default IP address, switch 904 maps UUT's IP address to a unique virtual local area network ("VLAN") in accordance with table 908. Thus, address contention between UUTs is reduced.

In one embodiment, a process of testing multiple routers concurrently includes activating serial number scanners by a test bed engine to read product serial numbers associated with DUTs that are attached to the test beds. After retrieving product specifications from a local database in accordance with the product serial numbers, one or more communication networks are emulated based on the product specifications for DUT testing. Upon generating a set of unique IP address within one or more communication networks, a unique IP address is assigned to each of the DUTs for DUT verifications. After providing a graphic representation illustrating a test configuration associated with each test bed, a graphic representation illustrating up-to-date status for concurrently testing of DUTs is provided or animated.

The exemplary aspect of the present invention includes various processing steps, which will be described below. The steps of the aspect may be embodied in machine or computer executable instructions. The instructions can be used to cause a general purpose or special purpose system, which is programmed with the instructions, to perform the steps of the exemplary aspect of the present invention. Alternatively, the steps of the exemplary aspect of the present invention may be performed by specific hardware components that contain hard-wired logic for performing the steps, or by any combination of programmed computer components and custom hardware components.

Figure 10:
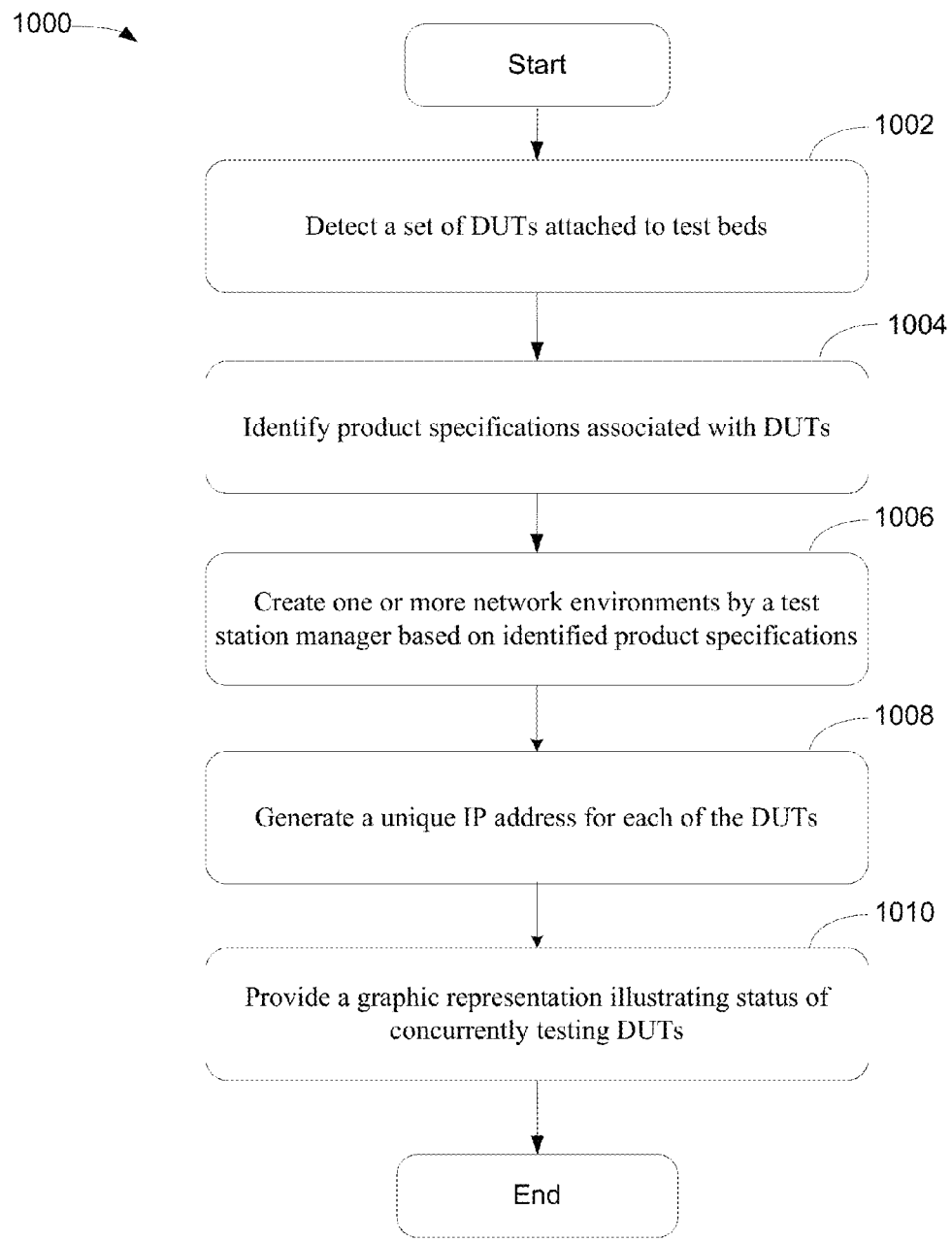
FIG. 10 is a chart illustrating a process of concurrent verification of multiple network devices in accordance with one embodiment of the present invention.

FIG. 10 is a chart 1000 illustrating a process of concurrent verification of multiple network devices in accordance with one embodiment of the present invention. At block 1002, a process capable of testing multiple network devices concurrently includes detecting a set of DUTs that are attached to a set of test beds controlled by a test bed engine. In one example, all of the test beds are activated to determine which test beds are coupled with the DUTs and which test beds are idle.

At block 1004, product specifications associated with the DUTs are identified in accordance with information received by the test bed engine from the DUTs. In one embodiment, after identifying types and manufactures of the DUTs, related specifications are retrieved based on the types and manufactures of detected DUTs from a local DB. Alternatively, related specifications may be retrieved by downloading from manufacture website when the relevant specification is not available at the local database.

At block 1006, one or more network environments are created or emulated by the TS manager based on identified product specifications. In one example, a network environment similar to Ethernet is generated to test the DUT if the DUT is an Ethernet router.

At block 1008, a unique IP address for a DUT is generated in accordance with the network environment suitable for the DUT. In one example, the process is capable of dynamically creating and assigning a unique IP addresses to the DUT.

At block 1010, a graphic representation illustrating real-time up-to-date status for concurrent testing DUTs is provided. Upon receiving a request for TS access from a requester, activating an authentication process based on information retrieved from a local database is activated in response to the request. The process is capable of facilitating substantial real-time interactive communication between a user and the TS. Note that substantial real-time means approximately the same time as the real time.

While particular embodiments of the present invention have been shown and described, it will be obvious to those of skills in the art that based upon the teachings herein, changes and modifications may be made without departing from this exemplary embodiment(s) of the present invention and its broader aspects. Therefore, the appended claims are intended to encompass within their scope all such changes and modifications as are within the true spirit and scope of this exemplary embodiment(s) of the present invention.

What is claimed is:

1. A test station ("TS") for verifying network devices, comprising:
   a user interface ("UI") able to facilitate interactive communication between the TS and a user, and able to graphically display a plurality test configurations and results;
   a test bed engine, coupled to the UI, having a plurality of test beds capable of conducting tests to a plurality of device under tests ("DUTs") via various line connections; and
   a TS manager, coupled to the test bed engine, containing a client server interface, a database interface, a user verification module, and a monitoring component, and configured to provide a test environment with one or more emulated communication networks for testing each of the plurality of DUTs, wherein the database interface is able to communicate with an external database,
   wherein the test bed engine includes a plurality of test beds having multiple connectors configured to communicate with attached DUTs, a DUT detector coupled to the plurality of test beds and configured to sense number of DUTs that are coupled to the test bed engine, a network environment duplicator capable of providing an independent communication network to each of attached DUTs with the test beds, and an internet protocol ("IP") address generator configured to generate unique IP addresses for a plurality of DUTs.

2. The test station claim 1, further comprising a local database ("DB") coupled to the TS manager and configured to store information relating to various product identifications ("IDs") of the plurality of DUTs and product specifications associated to at least one product ID.

3. The test station of claim 1, wherein the UI includes:
   an authenticator configured to authenticate user's identity via a graphical representation; and
   a configuration illustrator coupled to the authenticator and able to illustrate testing configuration via a graphical illustration.

4. The test station of claim 3, wherein the UI includes a testing monitor able to provide testing status for various DUTs wherein all of the test status is updated substantially simultaneous.

5. The test station of claim 1, wherein the TS manager is able to retrieve product specifications associated with product serial number from a local database in accordance with detected DUT.

6. The test station of claim 5, wherein the TS manager is able to activate substantially concurrent verification tests to a plurality of attached DUTs in response to various identified product specifications.

7. The TS of claim 1, wherein the DUT is one of router, switch, and hub capable of transmitting data packets.

8. A test station ("TS") for verifying network devices, comprising:
- a user interface ("UI") able to facilitate interactive communication between the TS and a user, and able to graphically display a plurality test configurations and results;
- a test bed engine, coupled to the UI, having a plurality of test beds capable of conducting tests to a plurality of routers via cable connectors; and
- a TS manager, coupled to the test bed engine, containing a client server interface, a database interface able to couple to an external database and a monitoring component able to concurrently provide testing status for graphic displaying to the user,
- wherein the test bed engine includes a plurality of test beds having multiple connectors configured to communicate with attached DUTs, a DUT detector coupled to the plurality of test beds and configured to sense number of DUTs that are coupled to the test bed engine, a network environment duplicator capable of providing an independent communication network to each of attached DUTs with the test beds, and an internet protocol ("IP") address generator configured to generate unique IP addresses for a plurality of DUTs.

9. The test station claim 8, further comprising a local database ("DB") coupled to the TS manager and configured to store information relating to various product identifications ("IDs") of the plurality of routers and product specifications associated to at least one product ID.

10. The test station of claim 8, wherein the UI includes:
- an authenticator configured to authenticate user's identity via a graphical representation; and
- a configuration illustrator coupled to the authenticator and able to illustrate testing configuration via a graphical illustration.

11. The test station of claim 10, wherein the UI includes a testing monitor able to provide testing status for various routers wherein all of the test status is updated simultaneous.

12. The test station of claim 8, wherein the test bed engine includes:
- a plurality of test beds having multiple connectors configured to communicate with attached routers; and
- a DUT detector coupled to the plurality of test beds and configured to sense number of routers that are coupled to the test bed engine.

13. The test station of claim 12, wherein the test bed engine includes a network environment duplicator capable of providing an independent communication network to each of attached routers with the test beds.

14. The test station of claim 13, wherein the test bed engine includes an internet protocol ("IP") address generator configured to generate unique IP addresses for routers.

15. A test station ("TS") for verifying network devices, comprising:
- a user interface ("UI") able to facilitate interactive communication between the TS and a user, and able to graphically display test configurations and results;
- a TS manager coupled to the UI and configured to have a database interface capable of communicating with a local database, wherein the TS manager provides one or more emulated communication networks for testing; and
- a test bed engine coupled to the UI and configured to have multiple test beds capable of conducting tests to a set of network devices via line connectors, wherein the test bed engine contains a sensor able to sense number of network devices attached to the test beds,
- wherein the test bed engine includes a plurality of test beds having multiple connectors configured to communicate with attached DUTs, a DUT detector coupled to the plurality of test beds and configured to sense number of DUTs that are coupled to the test bed engine, a network environment duplicator capable of providing an independent communication network to each of attached DUTs with the test beds, and an internet protocol ("IP") address generator configured to generate unique IP addresses for a plurality of DUTs.

16. The test station claim 15, further comprising a server containing the local database coupled to the TS manager and configured to store information relating to various product identifications ("IDs") of the network devices and product specifications associated to at least one product ID.

17. The test station of claim 15, wherein the UI includes:
- an authenticator configured to authenticate user's identity via a graphical representation; and
- a configuration illustrator coupled to the authenticator and able to illustrate testing configuration via a graphical illustration.

* * * * *